(12) United States Patent
Maxwell et al.

(10) Patent No.: US 6,195,766 B1
(45) Date of Patent: Feb. 27, 2001

(54) SYSTEM AND METHOD FOR PROVIDING SOFT AUDIO AND SOFT MODEM COPY PROTECTION FOR HARDWARE INTERFACES AND SOFTWARE CODE

(75) Inventors: Conrad A. Maxwell; David P. Braun, both of Irvine; Tom Lau, Coto de Caza, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/309,205

(22) Filed: May 10, 1999

(51) Int. Cl.$^7$ .................................................. G06F 11/00
(52) U.S. Cl. ............................................. 714/38; 713/200
(58) Field of Search ................................. 714/38, 25, 27, 714/33, 36, 37, 39, 45; 713/200, 201, 202

(56) References Cited

U.S. PATENT DOCUMENTS

| | | | |
|---|---|---|---|
| 5,163,091 | * 11/1992 | Graziano et al. | 380/25 |
| 5,473,638 | 12/1995 | Marchetto et al. | 375/356 |
| 5,515,474 | * 5/1996 | Deacon et al. | 395/2.1 |
| 5,652,793 | * 7/1997 | Priem et al. | 380/4 |
| 5,790,674 | * 8/1998 | Houvener et al. | 380/23 |
| 6,016,550 | 1/2000 | Kokkosoulis et al. | 713/400 |
| 6,040,783 | * 3/2000 | Houvener et al. | 340/825.31 |
| 6,041,411 | * 3/2000 | Wyatt | 713/200 |
| 6,052,780 | * 4/2000 | Glover | 713/193 |

* cited by examiner

Primary Examiner—Nadeem Iqbal
(74) Attorney, Agent, or Firm—Price and Gess

(57) ABSTRACT

A system and method for providing soft modem and soft audio copy protection for hardware interfaces and software code utilized in an AC '97 architecture to prevent against unauthorized copying. The system confirms that a codec connected to the AC '97 architecture is provided by a desired supplier. The system performs a sample rate negotiation to determine an operating sample rate for data transfer. When the system provides a desired sample rate which does not correspond to a sample rate appearing in a predefined set of sample rates supported by an AC '97 architecture, the system expects the codec to echo back a predesignated sample rate during the sample rate negotiation indicating that a desired sample rate has been received which does not correspond to one of the supported sample rates. When the system determines that the predesignated sample rate has been echoed back, the copy protection system recognizes the codec as being provided by an authorized supplier and authorizes the codec for operation. However, the system disables the attached codec when it determines that the predesignated sample rate has not been echoed back from the codec in response to reading an unsupported sample rate from the control register. This provides the security feature of ensuring that the attached codec is provided by an authorized supplier.

28 Claims, 3 Drawing Sheets

SYSTEM AND METHOD FOR PROVIDING SOFT AUDIO AND SOFT MODEM COPY PROTECTION FOR HARDWARE INTERFACES AND SOFTWARE CODE

BACKGROUND OF THE INVENTION

1. Field of the Invention

The present invention relates generally to the identification of hardware devices connected to a computer, and specifically to a system and method for performing hardware identification of components connected to an AC '97 architecture for software based operations.

2. Description of Related Art

Personal computers are used for a wide variety of multimedia applications, where it is now becoming desirable for personal computers (PCs) to function with high quality audio performance. Current PC audio architectures are designed to run midrange audio-performance-integrated ISA products. In order to provide PCs with high performance/ high quality audio comparable to electronic devices, a new PC architecture capable of providing this performance needed to be developed. Thus, a computer industry consortium developed a new PC audio architecture, the Audio Codec '97 (AC '97), for next-generation audio-intensive PC applications, such as DVD, 3-D multiplayer games, and interactive music. The AC '97 architecture defines a high quality audio architecture for a PC platform to support a wide range of high quality audio solutions. The AC '97 architecture further allows highly versatile modem communication to transpire The AC '97 architecture includes at least one codec 100 and codec controller 102 connected through a digital serial link, referred to as an AC-link bus 104, as shown in FIG. 1. The codec 100 performs digital-to-analog conversion (DAC) and analog-to-digital conversion (ADC), mixing, analog processing, and modem codec functions. The codec 100 functions as a slave to the digital codec controller 102, which, in turn, is connected to the CPU 108 of the host personal computer 106. The codec 100 communicates with the codec controller 102 through the AC-link bus 104. The codec 100 may include both an audio DAC/ADC and a modem DAC/ADC controlled by the codec controller 102. The codec 100 performs the appropriate data conversion and communicates analog signals to an input/output device, such as a communication line through a data access arrangement (DAA) 110 when performing modem functions or an audio device 112 when performing audio functions. The AC-link bus 104 was specifically designed to directly connect the codec 100 to the codec controller 102. In prior PC architectures, it was necessary to connect an interface device between the codec 100 and the core logic controlling the codec 100. The AC '97 eliminates the need for a separate interface device to be incorporated by utilizing the AC-link bus 104 to directly connect the codec 100 to the codec controller 102.

All digital audio streams, modem line codec streams, and command/status information are communicated over the AC-link bus in data streams according to a predefined protocol developed for the AC '97 architecture. The codec 100 must be capable of performing variable sample rate DAC and ADC conversions, where the AC '97 infrastructure can support data streams at a variety of required sample rates for modem transmissions. The AC '97 component specification sets forth the various sample rates required for modem operation for the connected codecs and codec controllers. The communication protocol defined by the industry consortium is set forth in the *Audio Codec'97 Component Specification*, Revision 1.03, released Sept. 15, 1996 by the Audio Codec'97 Working Group, *Audio Codec '97*, Revision 2.0, released Sept. 29, 1997 by Intel Corporation, and *Audio Codec '97*, Revision 2.1, released May 22, 1998 by Intel Corporation. The disclosures of Revisions 1.03, 2.0, and 2.1 of the Audio Codec '97 are hereby incorporated by reference into this disclosure.

For data transfer operations, the codec 100 and codec controller 102 operate at a sample rate selected from a set of predefined sample rates supported by the AC '97 architecture. The codec 100 and codec controller 102 should be capable of operating at each of the supported sample rates in the set. For instance, sample rates of 8000, 9600, 13714.28, and 16000 Hz are included in the predefined set of sample rates for modem ADC/DAC. Each codec 100 is governed by a modem sample rate control register that contains a 16-bit unsigned value between 0 and 65535, representing the sample rate in operation of Hz. A software driver initially indicates the desired sample rate to the codec controller 102 and this sample rate is written into the control register. The codec 100 reads the sample rate from the control register. If the sample rate written into the control register corresponds to one of the predefined supported sample rates, then the codec 100 will echo back this sample rate after it is read from the control register. The echoed back sample rate will then be utilized as the operating sample rate by the codec 100 and codec controller 102. When a sample rate is written into the control register which does not correspond to one of the predefined sample rates, the AC '97 component specification instructs the codec 100 to return the closest supported sample rate from the predefined set of sample rates. For example, if a sample rate of 16004 Hz is written into the control register, the closest supported sample rate is 16000 Hz and this sample rate will be returned by the codec 100.

Software based operations, such as soft modems and soft audio, utilize a host processor on a personal computer controlled by software drivers to perform the operations, thus reducing the hardware requirements by eliminating the need for certain hardware components. The only required hardware for a soft modem comprises a data access arrangement (DAA), digital to analog converter (codec), analog to digital converter, and bus interface. Modulation and modem controller functions are performed by a software driven codec controller or host processor. In order to prevent unauthorized piracy of the software drivers specifying the modem control functions or other software based operations, certain security measures are required to ensure that the software drivers and hardware components are both provided by desired suppliers.

The industry consortium developing the AC '97 architecture wanted to promote interoperability between codecs and codec controllers produced by different vendors to function according to AC-link protocol. Thus, the AC '97 architecture allows interoperability between codecs and codec controllers produced by different vendors as long as the attached components follow the specified protocol. This interoperability of components can compound the ever-present problem in the computer industry of the piracy of hardware components and software If the software drivers produced by one vendor for controlling their own codecs and codec controllers are pirated by a competing vendor, it is possible for the competing vendor to utilize their own hardware interfaces in conjunction with the copied driver software to function in accordance with the protocol of the AC '97 architecture .There is clearly a need for a system and method for providing protection against unauthorized copying of hardware interfaces and software code utilized in the AC '97 architecture. Moreover, there is a need for a system and method for identifying whether the hardware components connected in the AC '97 architecture are provided by a desired supplier.

SUMMARY OF THE INVENTION

It is a primary object of the present invention to overcome the aforementioned shortcomings associated with the prior art.

The present invention provides a system and method for providing copy protection for hardware interfaces and software code utilized in an AC '97 architecture to prevent against unauthorized copying.

The present invention further provides a system and method for identifying the hardware components utilized in an AC '97 architecture as being provided by an authorized supplier.

These as well as additional advantages of the present invention are achieved by providing a system and method for providing hardware component identification to ensure that software driven components connected over an AC-link bus are provided by a desired supplier. The copy protection system confirms that a codec interconnected to a codec controller through an AC-link bus is provided by a desired supplier. The codec and codec controller are capable of data transfer at various sample rates required for the AC '97 architecture, where a sample rate negotiation is performed between the components to determine an operating sample rate for data transfer. The sample rate negotiation performed between the codec and the codec controller is further used to identify whether the attached codec is provided by a desired supplier. A desired sample rate is initially selected by the codec controller and provided to the codec. The codec will echo back the same sample rate if it corresponds to one of the sample rates from the predefined set of supported sample rates However, when the selected sample rate provided to the codec does not correspond to one of the predefined supported sample rates, the codec will echo back a predesignated sample rate indicating that a sample rate has been received which does not correspond to one of the supported sample rates for the AC '97 architecture. The operation of the present invention diverges from the sample rate negotiation taught in the AC '97 component specification, which instructs the codec to return the closest supported sample rate from the predefined set of sample rates.

The copy protection system of the present invention checks to ensure that the predesignated sample rate has been echoed back by the codec instead of the closest supported sample rate in response to receiving a non-supported sample rate. When the predesignated sample rate has been echoed back, the copy protection system recognizes the attached codec as being provided by a desired supplier. However, the system disables software operations for the attached codec when it determines that the predesignated sample rate has not been echoed back from the codec in response to receiving an unsupported sample rate. This provides the security feature of ensuring that the attached codec is provided by the desired supplier, even if the software drivers controlling modem operations are pirated.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system and method for providing soft modem and soft audio copy protection for hardware interfaces and software code utilized in an AC '97 architecture.

Figure 2:
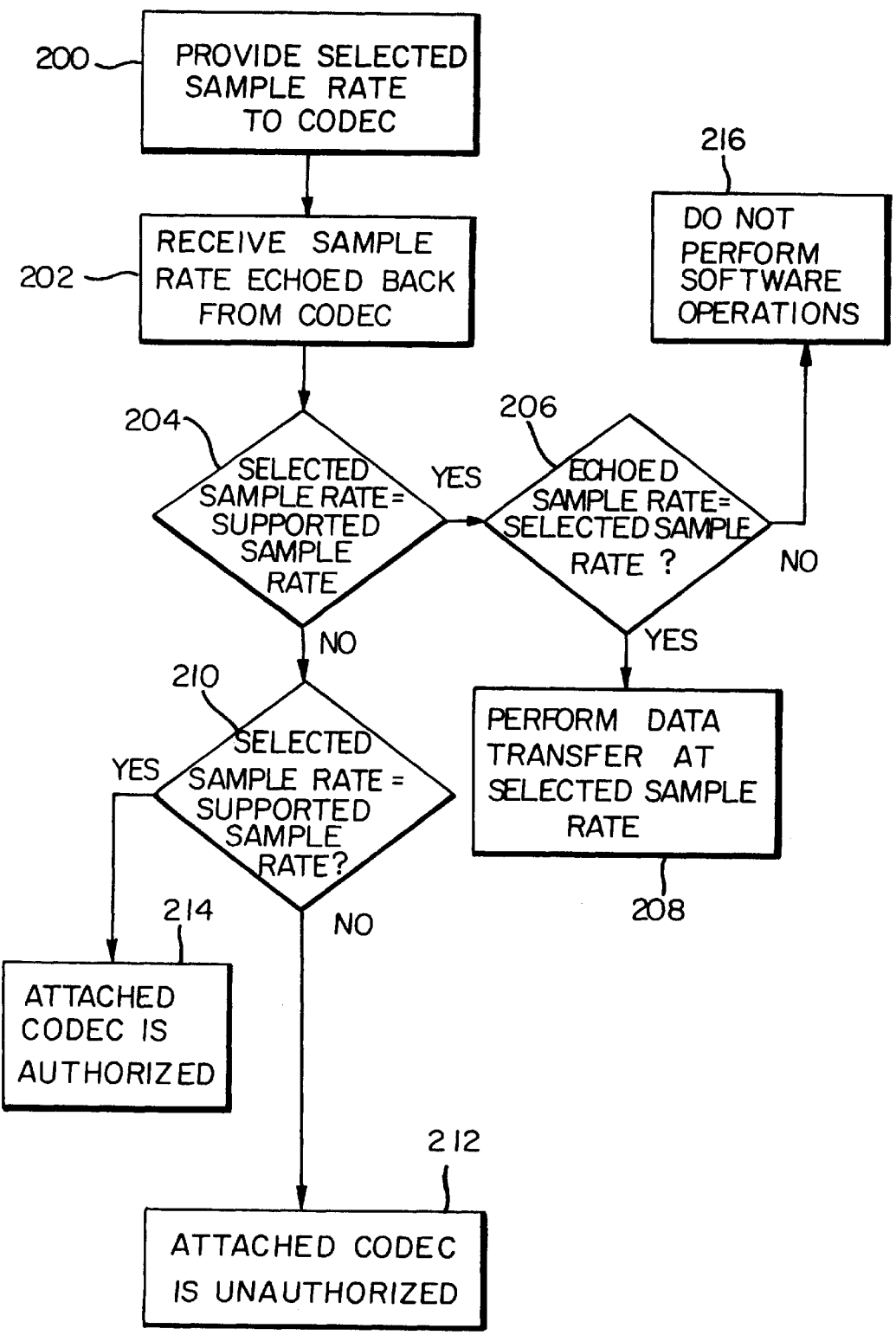
FIG. 2 is an operational block diagram of a preferred method of the present invention for performing soft modem and soft audio copy protection for hardware interfaces and software code utilized on an AC-link bus.

Referring now to FIG. 2, an operational block diagram of the method for providing soft modem and soft audio copy protection for hardware interfaces and software code utilized in an AC '97 architecture is illustrated. The hardware interface will be hereinafter described as a codec 100 connected to a codec controller 102 through an AC-link bus 104. However, it is understood that the present invention can be utilized for identifying any hardware device connected within the AC '97 architecture, such as a modem codec, audio codec, or digital signal processing device. The codec 100 and codec controller 102 possess the capabilities of performing data transfer at a variety of possible sample rates, including those specified for the AC '97 architecture. The codec 100 and codec controller 102 negotiate a sample rate with each other to determine an operating sample rate to be utilized for data transfer. This sample rate negotiation is used by the present invention to identify whether the codec 100 is provided by a desired supplier.

Initially in step 200, the codec controller 102 selects a desired sample rate and provides the selected sample rate to the codec 100. The selected sample rate may be provided to the codec 100 in a variety of possible manners, but is preferably accomplished by writing the selected sample rate into a control register across the AC-link bus 104 and then having the codec 100 read the sample rate from the control register. In step 202, the codec 100 echoes a sample rate back to the codec controller 102 in response to the codec controller 102 issuing a read command of the sample rate across the AC-link 104. It is determined in step 204 whether the selected sample rate provided by the codec controller 102 is a sample rate supported by the AC '97 architecture. If the selected sample rate corresponds to one of the sample rates from a predefined set of sample rates supported by the AC '97 architecture, then a comparison is made in step 206 to determine if the sample rate echoed back from the codec 100 matches the selected sample rate provided by the codec controller 102. When the echoed sample rate matches the selected sample rate, the system authorizes the codec 100 and codec controller 102 to perform data transfer according to the selected supported sample rate in step 208. When the selected sample rate is a supported sample rate but does not match the echoed sample rate, the copy protection method will move to step 216 to cancel the software operation of the attached component.

When the selected sample rate provided to the codec controller 102 does not correspond to one of the supported sample rates from the predefined set of sample rates supported by the AC '97 architecture, the copy protection method moves on to step 210 where a comparison is made to determine if a predesignated sample rate has been echoed back from the codec 100. When an unsupported sample rate is selected by the codec controller 102, codecs 100 provided by desired suppliers are designed to echo back the predesignated sample rate to indicate that the selected sample rate does not correspond to one of the supported sample rates. If the comparison performed in step 210 determines that the echoed sample rate received by the codec controller 102 does not correspond to the predesignated sample rate, the attached codec 100 is identified as being provided by an unauthorized supplier in step 212. Unauthorized codecs 100 may then be disabled to prevent software operations from being allowed to transpire. When the sample rate echoed from the codec 100 matches the predesignated sample rate, the codec 100 is identified as being provided by a desired supplier and the codec is authorized for modem operations in step 214. The method described in steps 200 through 216 may be performed repeatedly to protect against the security test being incidentally satisfied when sample rates supported by the AC '97 architecture are selected as desired sample rates by the codec controller 102.

This sample rate negotiation performed between the codec 100 and codec controller 102 diverges from the negotiation operation specified in the AC '97 component specification, which instructs an attached codec 100 to echo back the closest supported sample rate from the predefined set of sample rates in response to receiving the selected sample rate provided by the codec controller. Thus, the copy protection method of the present invention checks to ensure that the predesignated sample rate has been echoed back by the codec instead of the closest supported sample rate in response to unsupported sample rates. Only codecs manufactured by a desired supplier will be designed to operate by echoing back the predesignated sample rate, whereas codecs manufactured by other suppliers would be designed in accordance with the operating method taught in the AC '97 component specification. The copy protection system disables the attached codec when it determines that the predesignated sample rate has not been echoed back when an unsupported sample rate has been read from the control register.

Figure 3:
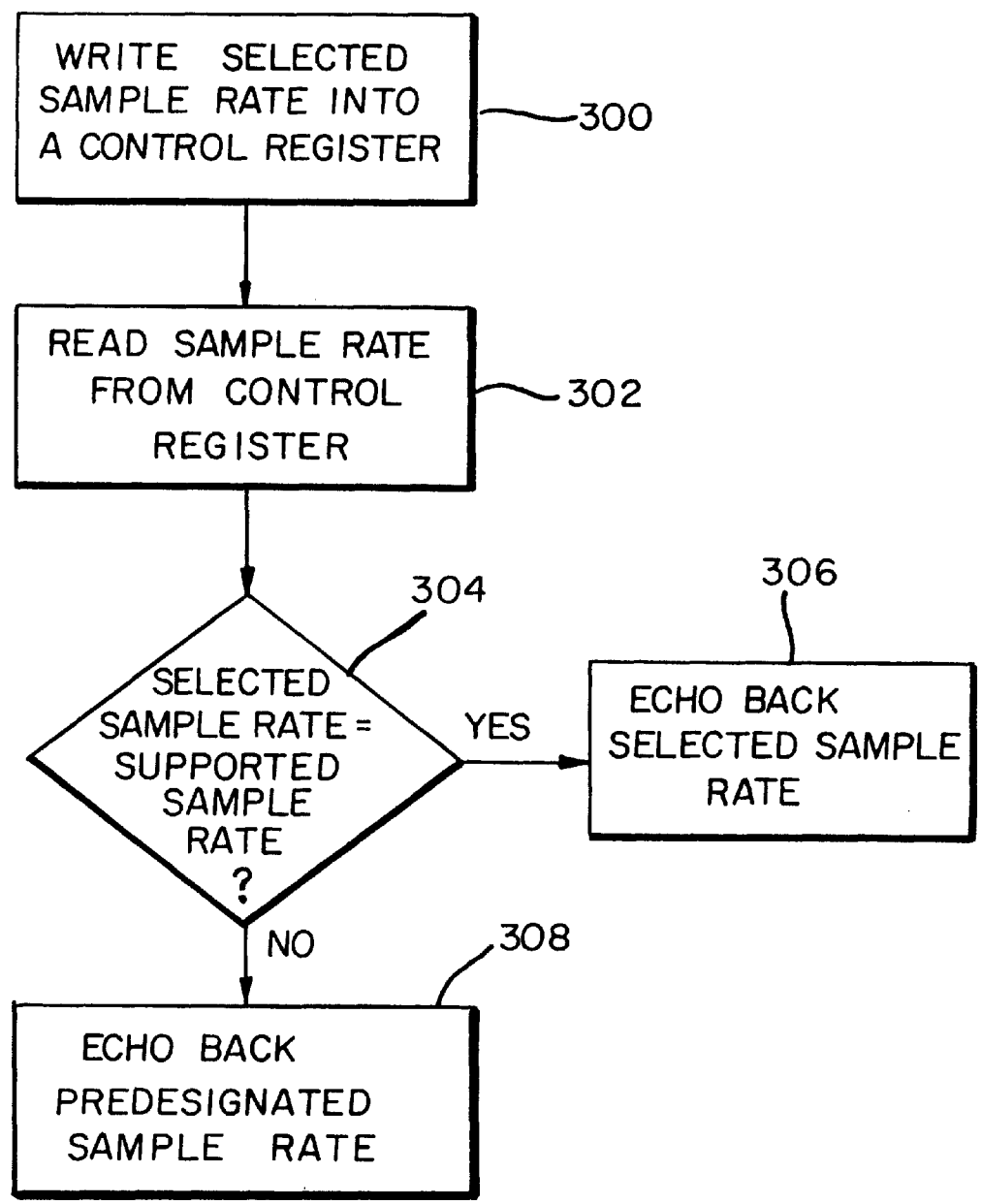
FIG. 3 is an operational block diagram of the sample rate negotiation performed by the codec of the present invention.

Referring now to FIG. 3, a block diagram of the operation of the codec 100 in accordance with the present invention is illustrated. Initially in step 300, the selected sample rate provided by the codec controller 102 is written into a control register. In step 302, the selected sample rate is read from the control register by the codec 100. The codec 100 compares the selected sample rate with a predefined set of sample rates supported by the AC '97 architecture in step 304. If the selected sample rate corresponds to a sample rate in the predefined set, the codec 100 echoes back the selected sample rate to the codec controller 102 in the step 306. When the selected sample rate fails to correspond to one of the supported sample rates, the codec 100 echoes back a predesignated sample rate in step 308 indicating that a non-supported sample rate has been received by the codec 100. The codec 100 may comprise any device which functions as an AC-link device according to the AC '97 architecture. The codec controller 102 may either be a stand-alone device or an integrated motherboard device such as a PCI bridge. It is also possible to even combine the codec controller 102 into the core-logic 108 of the host computer 106.

For the purposes of illustrating the operation of the present invention, the following example will now be described. The AC '97 component specification requires that (at least sample rates of 8000, 9600, 13714.28, and 16000 Hz be included in the predefined set of sample rates for modem operations, where the hardware components may be capable of additionally operating at other sample rates. If the codec 100 receives a request to operate at a sample rate of 16004 Hz, the codec 100 recognizes that this is a non-supported sample rate. Thus, the codec 100 will echo back a predesignated sample rate, i.e. 24000 Hz, to the codec controller 102. Since the codec controller 102 is aware that a non-supported sample rate was provided to the codec 100, the codec controller 102 expects to receive the predesignated sample rate of 24000 Hz echoed back from the codec 100. If an echoed back sample rate of 24000 Hz is detected by the codec controller 102, the codec 100 is identified as being supplied by a desired supplier and data transfer f or modem operation s is per formed at the predesignated sample rate.

Meanwhile, codecs which are designed to operate in accordance with the AC '97 component specification would instead echo back t he closest supported sample rate to the non-supported sample rate receive d from the codec controller . Thus, a codec provided by an undesired supplier would echo back a sample rate of 16000 Hz in response to receiving a rate of 16004 Hz from the codec controller. The codec controller would then recognize that the echoed back sample rate did not correspond to the predesignated rate of 24000 Hz, and the attached codec would be identified as being supplied by an unauthorized supplier and modem operations would be disabled. It is understood that the above-described example is merely described for the purpose of illustrating the manner in which hardware interfaces supplied by desired suppliers are identified by the present invention. This example is not intended to and does not encompass all possible manners in which the soft modem copy protection method of the present invention is implemented.

Figure 1:
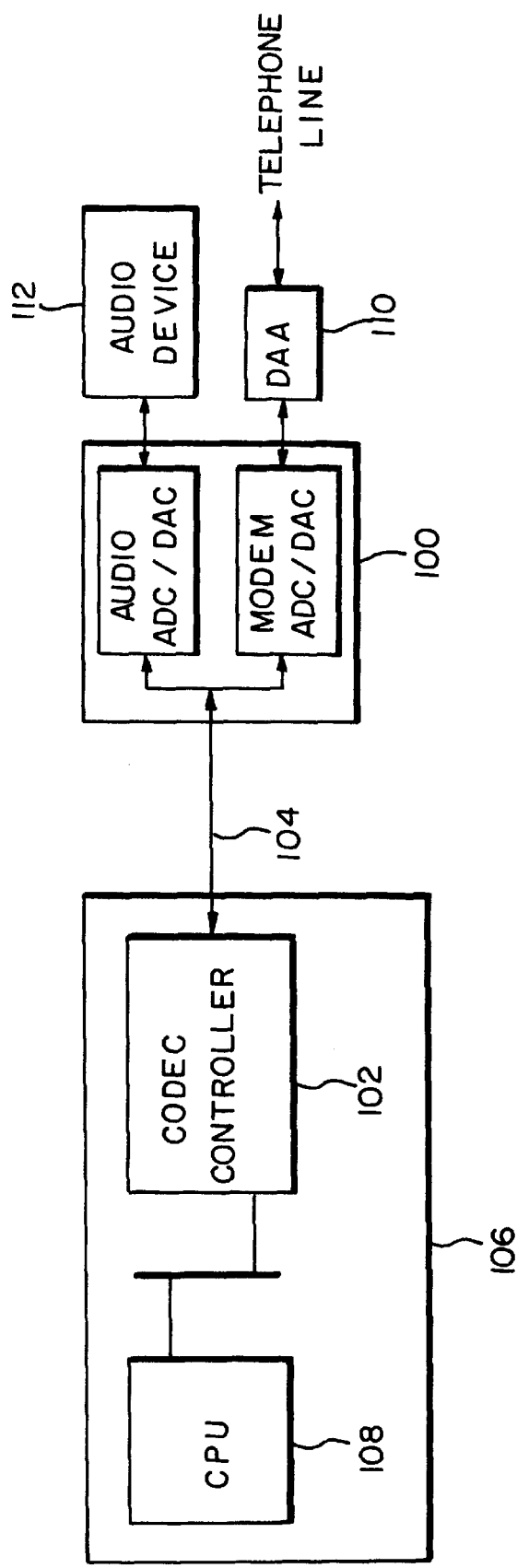
FIG. 1 is a schematic block diagram of an Audio Codec '97 computer architecture.

The system for implementing the soft modem and soft audio copy protection of the present invention is provided by incorporating the copy protection method into the e AC '97 architecture shown in FIG. 1. Software drivers for implementing the copy protection method are installed in the host computer 106 to control the coder controller 102. If those software drivers for the codec controller 102 are undesirably pirated, the soft modem and soft audio copy protection method of the present invention will also be copied along therewith. Thus, when software pirates copy the software control code of a desired supplier and attempt to substitute their own hardware interfaces for those of the desired supplier, the software control code governing the codec controller 102 will render the hardware interfaces of the copying party inoperative. The present invention provides security against piracy of hardware components and software code used in an AC '97 architecture by ensuring that the attached codec 100 is provided by a desired supplier before allowing software operations to transpire.

As can be seen from the foregoing, a system and method for providing soft modem and soft audio copy protection for hardware interfaces and software code utilized in a AC '97 architecture in accordance with the present invention guards against unauthorized hardware and software piracy. Moreover, by forming a system and method for providing soft modem and soft audio copy protection for hardware interfaces and software code in accordance with the present invention, hardware interfaces in the AC '97 architecture can be identified as being provided by desired suppliers and authorized for proper use.

In each of the above embodiments, the structures of the system and method for providing soft modem and soft audio copy protection for hardware interfaces and software code utilized in a AC '97 architecture of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of authorizing a hardware interface connected to an AC '97 architecture for operation, comprising the steps of:

negotiating a sample rate to be used for data transfer with a hardware interface;

determining whether a predesignated sample rate is provided by the hardware interface during the negotiation step, wherein receipt of the predesignated rate identifies the hardware device as being provided by an authorized supplier; and authorizing the hardware interface for operation in response to receiving the predesignated sample rate.

2. The method of claim 1, wherein the negotiating step comprises the steps of:

selecting a desired sample rate to be used for data transfer;

providing the selected sample rate to the hardware interface; and receiving a response sample rate echoed back from the hardware interface in response to the selected sample rate provided to the hardware interface.

3. The method of claim 2, wherein receipt of the predesignated sample rate echoed back from the hardware device authorizes the hardware interface for operation when the selected sample rate provided to the hardware device fails to correspond to a sample rate existing within a predefined set of sample rates supported by an AC '97 architecture.

4. The method of claim 3, wherein the predesignated sample rate is not contained in the predefined set of sample rates supported by an AC '97 architecture.

5. The method of claim 2, wherein the step of providing the selected sample rate to the hardware interface includes the steps of:

writing the selected sample rate into a control register, and
    reading the selected sample rate from the control register to the hardware interface.

6. The method of claim 1, wherein the hardware interface is a modem codec which is authorized for soft modem operation.

7. The method of claim 1, wherein the hardware interface is an audio codec which is authorized for soft audio operation.

8. The method of claim 1, wherein the hardware interface is a digital signal processing device which is authorized for signal processing operation.

9. A method of providing copy protection for hardware devices and software code utilized with an AC '97 architecture, comprising the steps of:

selecting a desired sample rate to be used for data transfer;

providing the selected sample rate to the hardware interface; and receiving a response sample rate echoed back from the hardware interface in response to the selected sample rate provided to the hardware interface;

determining whether the echoed back sample rate is a predesignated sample rate, wherein receipt of the predesignated rate that the selected sample rate provided to the hardware device fails to correspond to a sample rate existing within a predefined set of sample rates supported by the AC '97 architecture; and authorizing the hardware interface for operation when the predesignated sample rate is echoed back by the hardware interface.

10. The method of claim 9, wherein data transfer is performed at the predesignated modem rate.

11. The method of claim 9, wherein receipt of the predesignated sample rate identifies the hardware interface as being provided by an authorized supplier.

12. The method of claim 9, wherein the predesignated sample rate is not contained in the predefined set of sample rates supported by an AC '97 architecture.

13. The method of claim 9, wherein the step of providing the selected sample rate to the hardware interface includes the steps of:

writing the selected sample rate into a control register, and
    reading the selected sample rate from the control register to the hardware interface.

14. The method of claim 9, wherein the hardware interface is a modem codec which is authorized for soft modem operation.

15. The method of claim 9, wherein the hardware interface is an audio codec which is authorized for soft audio operation.

16. The method of claim 9, wherein the hardware interface is a digital signal processing device which is authorized for signal processing operation.

17. A system for providing copy protection for hardware devices and software code utilized with an AC '97 architecture, comprising:

a hardware interface controller connected to the hardware interface through an AC-link bus, the controller device selecting a desired sample rate to be used for data transfer and providing the selected sample rate to the hardware interface;

sample rate negotiation means for receiving a response sample rate echoed back from the hardware interface in response to the selected sample rate provided to the hardware interface; and authorization means for determining whether the echoed back sample rate is a predesignated sample rate and authorizing the hardware interface for operation when the predesignated sample rate is found to have been echoed back by the hardware interface.

18. The system of claim 17, wherein data transfer is performed at the predesignated modem rate.

19. The system of claim 17, wherein the authorization means authorizes the hardware interface for operation in response to receipt of the predesignated sample rate echoed back from the hardware interface when the selected sample rate provided to the hardware interface fails to correspond to a sample rate existing within a predefined set of sample rates supported by an AC '97.

20. The system of claim 19, wherein the predesignated sample rate is not contained in the predefined set of sample rates supported by an AC '97 architecture.

21. The system of claim 17, wherein the hardware interface controller provides the selected sample rate to the hardware interface by writing the selected sample rate into a control register, where the selected sample rate is subsequently read from the control register by the hardware interface.

22. The system of claim 17, wherein the hardware interface is a modem codec which is authorized for soft modem operation.

23. The system of claim 17, wherein the hardware interface is an audio codec which is authorized for soft audio operation.

24. The system of claim 17, wherein the hardware interface is a digital signal processing device which is authorized for signal processing operation.

25. A method of operating a hardware interface connected to an AC '97 architecture during a sample rate negotiation with the AC '97 architecture, comprising the steps:

receiving a sample rate desired to be used for data transfer from an interface controller in the AC '97 architecture;

determining whether the desired sample rate corresponds to a sample rate existing with a predefined set of sample rates supported by the AC '97 architecture; and echoing back a predesignated sample rate to the interface controller when it is determined that the desired sample rate does not correspond to a sample rate in the predefined set of sample rates, wherein the predesignated sample rate identifies that the desired sample rate received from the interface controller fails to correspond to a sample rate existing within the predefined set of supported sample rates.

26. The method of claim 25, wherein the hardware interface is a modem codec which is authorized for soft modem operation.

27. The method of claim 25, wherein the hardware interface is an audio codec which is authorized for soft audio operation.

28. The method of claim 25, wherein the hardware interface is a digital signal processing device which is authorized for signal processing operation.

\* \* \* \* \*